C. HARTMAN.
BELT TENSION REGULATOR FOR ICE CUTTING MACHINES.
APPLICATION FILED JAN. 28, 1909.
1,040,198.
Patented Oct. 1, 1912.
2 SHEETS—SHEET 1.
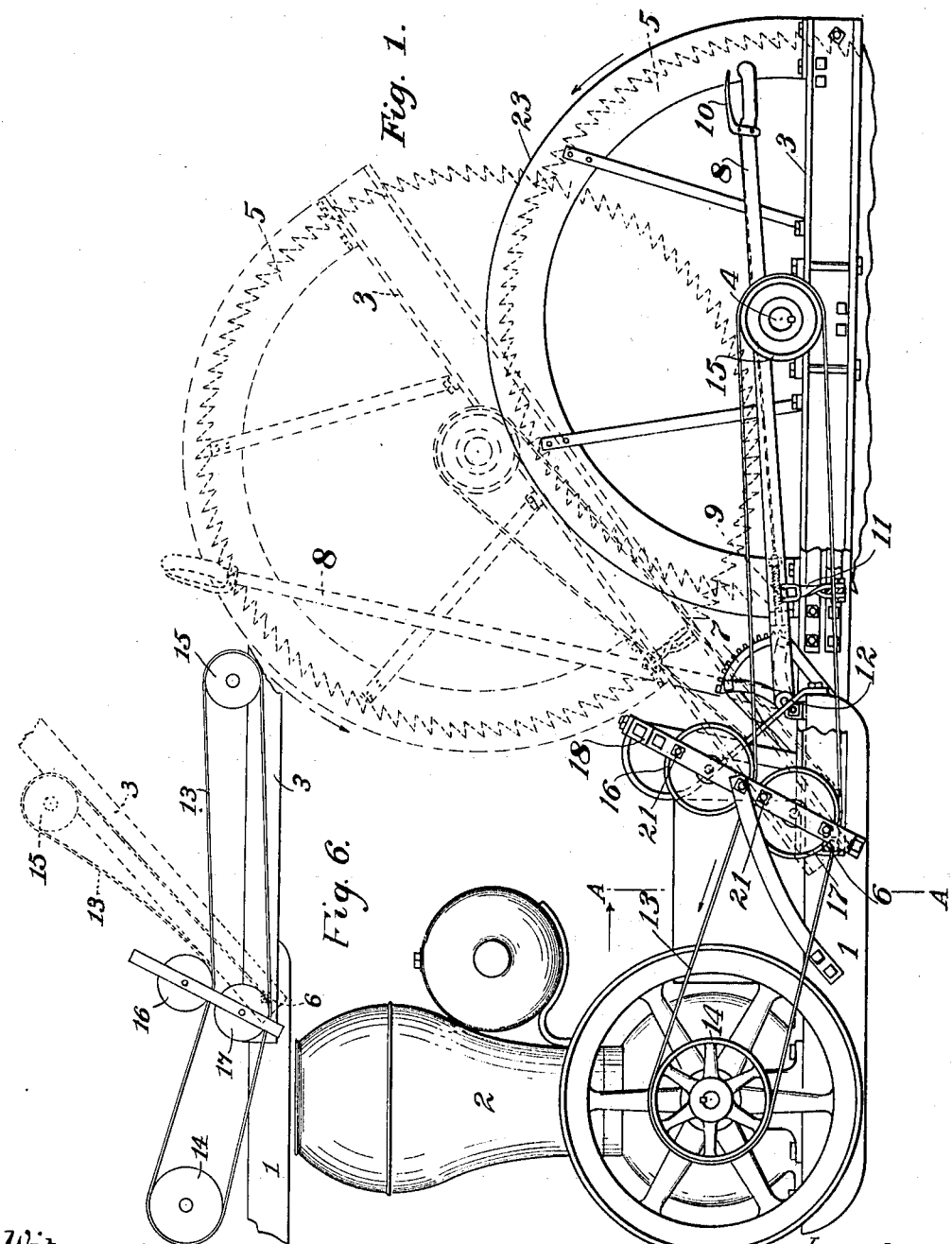

C. HARTMAN.
BELT TENSION REGULATOR FOR ICE CUTTING MACHINES.
APPLICATION FILED JAN. 28, 1909.
1,040,198.
Patented Oct. 1, 1912.
2 SHEETS—SHEET 2.
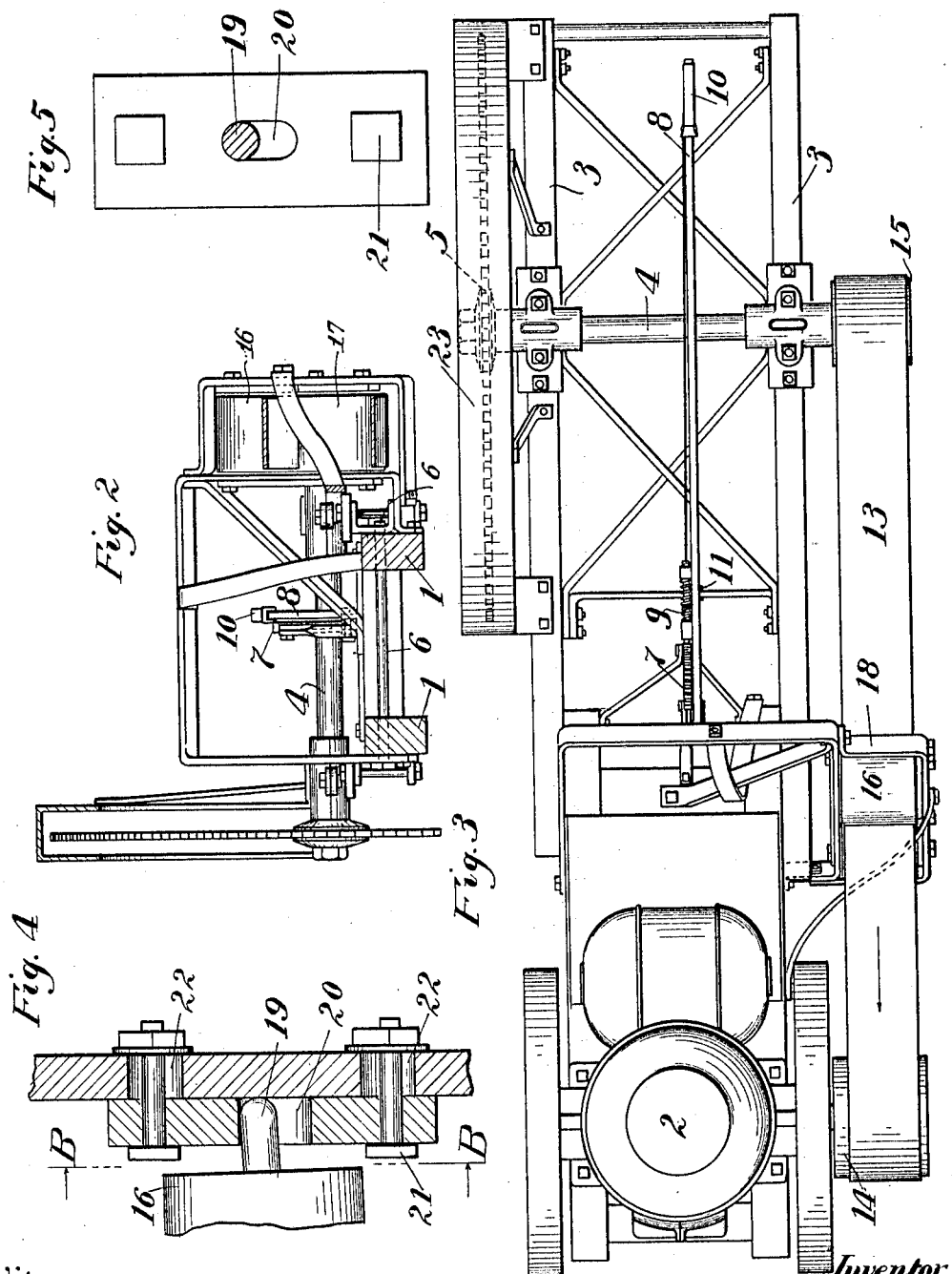
Witnesses:
Edwin Phelps.
Mary M. Hillman
Inventor:
Charles Hartman,
By Rummler & Rummler,
Attorneys.

UNITED STATES PATENT OFFICE.

CHARLES HARTMAN, OF CHADWICK, ILLINOIS.

BELT-TENSION REGULATOR FOR ICE-CUTTING MACHINES.

1,040,198. Specification of Letters Patent. Patented Oct. 1, 1912.

Application filed January 28, 1909. Serial No. 474,773.

*To all whom it may concern:*

Be it known that I, CHARLES HARTMAN, a citizen of the United States of America, and a resident of Chadwick, Carroll county, State of Illinois, have invented certain new and useful Improvements in Belt-Tension Regulators for Ice-Cutting Machines, &c., of which the following is a specification.

The main objects of this invention are to provide an improved and efficient form of portable ice cutting machine; to provide an improved construction for such machines whereby a circular saw may be operated by means of a portable motor arranged to be shifted along the surface of the ice, the saw being mounted so as to be shiftable vertically and secured at different elevations for cutting ice of different thicknesses or for supporting the saw clear of the ice; to provide improved means for connecting the motor with the saw arbor in such machine; and to provide an improved power transmitting and belt tension regulating device which is particularly adapted for machinery receiving rough usage and subject to great changes of temperature, where the parts are liable to become clogged with snow or ice, as is the case with ice cutting machinery.

A specific construction for accomplishing these objects is shown in the accompanying drawings, in which:

Figure 1 is a side elevation, partly broken away, of a portable ice cutting machine constructed according to this invention. Fig. 2 is a vertical section of the same taken on the line A—A of Fig. 1. Fig. 3 is a top plan of the same. Fig. 4 is a sectional detail of one of the bearings of the idlers which guide the belt. Fig. 5 is a section on the line B—B of Fig. 4. Fig. 6 is a diagrammatic view showing in dotted lines the slackening of the belt when the frame 3 is raised to the position indicated.

In the construction shown in the drawings, the support upon which the apparatus is mounted comprises a pair of runners or skids 1 rigidly connected together by a suitable transverse frame work and adapted to be slid along the ice. A motor 2 of any suitable type is carried by the supporting frame. At one end of the supporting frame is hinged a movable frame 3 upon which is journaled an arbor 4 carrying a rotary circular saw 5. The frame 3 is pivotally connected to the skids 1 by means of the horizontal shaft 6 which is parallel to the saw arbor and so disposed that the frame 3 may swing vertically so as to raise and lower the saw.

A toothed sector 7 is rigidly mounted in fixed position upon the supporting frame, and a lever 8 is pivotally mounted at the center of the sector and provided with a detent 9 adapted to engage the teeth of the sector 7 for locking the lever in different positions with respect to said sector. The detent is normally urged by means of a spring into engagement with the sector, and is withdrawn by means of a link connected with a pivoted hand grip 10 carried by the lever. The lever 8 is connected with the frame 3 by means of a link 11, and the pivotal center 12 upon which the lever 8 is mounted is so located with respect to the pivotal axis of the frame 3 as to provide the desired amount of leverage for conveniently raising the frame 3 by hand.

In the form shown in the drawings, the arbor 4 is driven by a belt 13 carried by the pulleys 14 and 15 and guided by idlers 16 and 17 which are mounted in such location that the saw 5 may be swung throughout a limited range of movement without seriously changing the tension of the belt. The idlers 16 and 17 are mounted in bearings carried by a frame 18 which is rigidly mounted on the support 1. In order that the saw may be driven while being lowered in cutting through the ice, the idlers 16 and 17 are journaled to such points relative to each other and to the pivotal axis 6 of the frame, that the peripheries of said idlers will allow the laps of the belt 13 to bend at points bearing such relation to the pivotal axis of the frame 3 and to each other that the lengthening of one lap of the belt will be compensated for by the shortening of the opposite lap.

It is not necessary that the idlers 16 and 17 be located at the positions shown in Fig. 1 of the drawings in order to accomplish the desired result of maintaining a driving tension on the belt during the movement of the frame 3 on its axis 6. The relative positions of the idlers and the axis 6 of the frame 3 may be changed to a considerable extent without interfering with such driving tension. For example, if both idlers 16 and 17 should be placed nearer to the pulley 14, so as to bring both of them to the left of the axis 6 of the frame 3, then the upward tilting of the frame 3 on its axis at 6 would necessarily slacken the belt. If the location of only one of the idlers is thus changed, while the other remains where it is shown, there would be a slackening upon raising the frame 3, but of less degree than if the position of both were changed as mentioned. If both idlers were placed nearer to the pulley 15 than they are shown in Fig. 1, any attempt to raise the frame 3 would necessarily result in increasing the tension on the belt. Likewise, if the position of one idler only is thus changed to a place nearer to the pulley 15, the tension on the belt would be increased upon raising the frame 3, but this would be of less degree than if the position of both is thus changed.

Fig. 1 illustrates one position of these idlers with relation to each other and to the pivotal axis 6, suitable for maintaining a driving tension on the belt during the movement of the frame 3, as in the act of sawing. If one of these idlers should be located farther to the right than shown in Fig. 1, and the other located farther to the left, the driving tension of the belt could still be maintained during raising and lowering of the frame 3. The lengthening of one lap of the belt will be compensated for by the shortening of the other lap. If it is desired to slightly decrease the driving tension when the frame 3 is raised and insure the maximum tension when the saw is down in the ice, then one or both of the idlers may be located slightly nearer to the pulley 14 than they would be if the driving tension were to be maintained substantially uniform. One of these positions for slackening of the belt, when the frame 3 is raised, is illustrated in an exaggerated degree in Fig. 6, in which the dotted lines 13 represent the belt. In this figure the idler 16 is in a position corresponding to its position in Fig. 1, while the idler 17 is located slightly to the left of its position in Fig. 1, with reference to the axis 6.

In practice, the location of the idlers is preferably such that while a driving tension of the belt is maintained both in the raised and lowered positions of the frame 3, the tension on the belt is slightly less when the frame 3 is in the raised position, as before its teeth cut into the ice, than when such frame is lowered to a position in which the teeth extend into or through the ice. An advantage of a slight decrease of tension of the belt when in the raised position is that the machine may be placed in this position when not in use, and thus permit shrinkage of the belt and relieve the strain on the belt without the necessity of shifting it off of one of the pulleys or idlers or adjusting other parts, while at the same time insuring that the greatest power is obtained when the saw is down in the ice. The machine may thus be stored away with the parts in position for immediate use.

The shafts of the idlers 16 and 17 are mounted in their bearings in such manner as to permit the idlers to be tilted in a plane transverse to the belt, so as to guide the belt in such manner that it will run true upon its pulleys. This is accomplished by making the bearings which are toward the front of Fig. 1 independently slidable in the frame 18 while the bearings at the other side of the idlers 16 and 17 are fixed. Each of these bearings should be arranged to permit the tilting of the shafts of the idlers. This may be done in the manner illustrated in Figs. 4 and 5, in which the ends of the shafts 19 are seated in vertically elongated openings 20. The shafts run true with such bearings because they are held in the upper parts of the bearings by the pull of the belt. The movable bearings which are at the front of Fig. 1 are carried by studs 21 mounted in the slots 22. The upper half of the cutting edge of the saw 5 is inclosed in a guard 23 which is rigidly supported by the frame 3.

The operation of the device shown is as follows:—The frame 3 may be secured in the position shown by dotted lines, so as to support the saw above the surface of the ice upon which the runners 1 are resting and allow the device to be readily moved from place to place. When in operation, the saw is driven in the direction of the arrows in Fig. 1 by means of the motor. In cutting ice, the saw is first lowered by means of the lever 8 to a proper elevation for insuring that it will cut entirely through the ice, and the whole apparatus is then either drawn or pushed along the ice in a direction parallel with the plane of the saw. As the saw completely overhangs one side of the frame, the apparatus will be supported by uncut ice as it is shifted along. It is usual to first plow grooves into the surface of the ice, and this device is then pulled along so as to follow such grooves.

The tilting of the idlers, as hereinbefore described, insures the proper guiding of the belt, for the reason that, as is well known, a belt shifts laterally toward high points on a surface over which the belt is running, and by tilting the idlers the belt may be caused to have a tendency to shift toward one side so that it will properly approach the pulley. The idlers need be adjusted only when the device is first assembled or when readjustment is needed to compensate for stretching of the belt.

Although but one specific embodiment of this invention is herein shown and described, it will be understood that numerous details of the construction shown may be altered or omitted without departing from the spirit of this invention.

I claim:—

1. The combination of a support, a driving pulley journaled thereon, a frame mounted on said support on a pivotal axis, a driven pulley journaled on said frame, a belt connecting said pulleys, and a pair of idlers having their peripheries bearing respectively upon the upper surfaces of the two laps of said belt, said idlers being journaled on said support and thereby maintained at a fixed distance apart during the movement of said frame on its pivotal axis, and at such positions with relation to each other and to said pivotal axis that the sum of the two tangents extending between the peripheries of said idlers and the periphery of the driven pulley along each lap of the belt, when said pulley is in the lowered position, is approximately the same as the sum of the corresponding tangents when said pulley is in the raised position, plus the lengths of the two arcs which lie between the tangent points on the idlers when said driven pulley is down and the tangent points thereon when said pulley is raised, whereby a driving tension on said belt is maintained during the movement of said frame, substantially as described.

2. The combination of a support, a driving pulley journaled thereon, a frame mounted on said support on a pivotal axis, a shaft journaled on said frame parallel with the pivotal axis thereof, a driven pulley on said shaft, a belt connecting said pulleys, and a pair of idlers having their peripheries bearing respectively upon the upper surfaces of the two laps of said belt, said idlers being journaled on said support and thereby maintained at a fixed distance apart during the movement of said frame on its pivotal axis and at such positions with relation to each other and to said pivotal axis that the sum of the two tangents extending between the peripheries of said idlers and the periphery of said driven pulley along each lap of the belt, when said pulley is in the lowered position, is approximately the same as the sum of the corresponding tangents when said pulley is in the raised position, plus the lengths of the two arcs which lie between the tangent points on the idlers when said driven pulley is down and the tangent points thereon when said driven pulley is raised, whereby a driving tension on said belt is maintained during the movement of said frame, substantially as described.

3. The combination of a support, a driving pulley journaled thereon, a frame mounted on said support on a pivotal axis, a driven pulley journaled on said frame, a belt connecting said pulleys, and a pair of idlers having their peripheries bearing respectively upon the upper surfaces of the two laps of said belt, one of said idlers being journaled on said support above, and with that part of its periphery which is in contact with the belt located near the pivotal axis of said frame on the side thereof toward the driven pulley, and the second idler being journaled on said support with that part of its periphery which is in contact with the belt located above, and slightly nearer to the driven pulley, than is the periphery of said first idler, said idlers being maintained in a fixed relation to each other and to said axis during the movement of said frame on its axis and located at such positions with relation to each other and to said pivotal axis that the sum of the two tangents extending between the peripheries of said idlers and the periphery of the driven pulley along each lap of the belt, when said pulley is in the lowered position, is approximately the same as the sum of the corresponding tangents when said pulley is in the raised position, plus the lengths of the two arcs which lie between the tangent points on the idlers when said driven pulley is down and the tangent points thereon when said driven pulley is raised, whereby a driving tension on said belt is maintained during the movement of said frame, substantially as described.

4. The combination of a support, a driving pulley journaled thereon, a frame mounted on said support on a pivotal axis, a driven pulley journaled on said frame, a belt connecting said pulleys, and a pair of idlers having their peripheries bearing respectively upon the upper surfaces of the two laps of said belt, said idlers being journaled on said support and thereby maintained at a fixed distance apart during the movement of said frame on its pivotal axis, said idlers having their axes located outside of the pivotal axis of said frame, and at such positions with relation to each other and to said pivotal axis that the sum of the two tangents extending between the peripheries of said idlers and the periphery of the driven pulley along each lap of the belt, when said pulley is in the lowered position, is approximately the same as the sum of the corresponding tangents when said pulley is in the raised position, plus the lengths of the two arcs which lie between the tangent points on the idlers when said driven pulley is down and the tangent points thereon when said pulley is raised, whereby a driving tension on said belt is maintained during the movement of said frame, substantially as described.

Signed at Chicago this 25th day of January, 1909.

CHARLES HARTMAN.

Witnesses:
 WM. R. RUMMLER,
 MARY M. DILLMAN.

---

Copies of this patent may be obtained for five cents each, by addressing the "Commissioner of Patents. Washington, D. C."